United States Patent
Okazaki et al.

[11] Patent Number: 5,259,667
[45] Date of Patent: Nov. 9, 1993

[54] ANTI-SKID BRAKE SYSTEM FOR AN AUTOMOTIVE VEHICLE

[75] Inventors: Haruki Okazaki; Fumio Kageyama; Toru Onaka; Yoji Kurihara, all of Hiroshima, Japan

[73] Assignee: Mazda Motor Corporation, Shinchi, Japan

[21] Appl. No.: 798,883

[22] Filed: Nov. 27, 1991

[30] Foreign Application Priority Data

Nov. 29, 1990 [JP] Japan .................. 2-333557
Nov. 29, 1990 [JP] Japan .................. 2-333558
Nov. 29, 1990 [JP] Japan .................. 2-333559

[51] Int. Cl.[5] .................. B60T 8/70
[52] U.S. Cl. .................. 303/111; 303/DIG. 4
[58] Field of Search ........ 364/426.01-426.03; 303/103, 110, 111, 95, 106, 109, DIG. 3, DIG. 4

[56] References Cited

U.S. PATENT DOCUMENTS

| | | | |
|---|---|---|---|
| 3,663,070 | 5/1972 | Scharlack | 303/110 |
| 3,709,566 | 1/1973 | Michellone et al. | 303/110 |
| 3,993,363 | 11/1976 | Skoyles et al. | 303/110 |
| 4,077,675 | 3/1978 | Leiber et al. | 303/110 X |
| 4,260,200 | 4/1981 | Brearley et al. | 303/110 X |
| 4,485,445 | 11/1984 | Braschel | 364/426.02 |
| 4,651,281 | 3/1987 | Masaki et al. | 303/110 X |
| 4,683,537 | 7/1987 | Matsuda | 364/426.02 |
| 4,725,952 | 2/1988 | Kitano et al. | 364/426.02 |
| 4,748,564 | 5/1988 | Matsuda | 303/110 X |
| 4,761,741 | 8/1988 | Agarwal et al. | 364/426.02 |
| 4,790,607 | 12/1988 | Atkins | 364/426.02 X |
| 4,886,322 | 12/1989 | Atkins | 303/110 X |
| 4,916,619 | 4/1990 | Walenty et al. | 364/426.02 |
| 4,924,394 | 5/1990 | Uchida et al. | 303/110 X |
| 5,016,178 | 5/1991 | Kuwana et al. | 303/110 X |
| 5,033,799 | 7/1991 | Braschel | 303/110 X |

Primary Examiner—Robert J. Oberleitner
Assistant Examiner—Alfred Maratori
Attorney, Agent, or Firm—Fish & Richardson

[57] ABSTRACT

An anti-skid brake system for the automotive vehicle is disclosed which is arranged to increase or decrease the braking oil pressure periodically on the basis of a comparison between the wheel speed and the assumed vehicle body speed. When the state in which the wheel is incipient to lock before the wheel speed is returned to the assumed vehicle body speed, the braking oil pressure is inhibited from being increased, thereby preventing the assumed vehicle body speed from deviating too far from the actual vehicle body speed. This anti-skid brake system can prevent the wheel from being locked due to having the assumed vehicle body speed set to too low a value relative to the actual wheel speed.

28 Claims, 9 Drawing Sheets

ANTI-SKID BRAKE SYSTEM FOR AN AUTOMOTIVE VEHICLE

BACKGROUND OF THE INVENTION

1. Field of the Invention

The present invention relates to an anti-skid brake system for an automotive vehicle and, more particularly, to an anti-skid brake system for an automotive vehicle s adapted to suppress an excessive braking force from being applied to the wheel during braking, particularly by periodically increasing or decreasing braking oil pressure on the basis of a wheel speed detected by a wheel speed sensor.

2. Description of the Related Art

Recently, an increasing number of automotive vehicles are loaded with an anti-skid brake system (usually called "ABS system") which is arranged to prevent the wheel from being locked or skidded at the moment of braking. In order to operate the anti-skid brake system, basically, it is required to determine a slip value of the wheel that is incipiently locked or skidded and the slip value is determined on the basis of a speed of the vehicle body and speeds of the wheels.

Hence, the anti-skid brake system for the automotive vehicle is generally provided with a wheel speed sensor for detecting the speed of rotation of the wheel and an electromagnetic control valve for adjusting the braking oil pressure. The anti-skid brake system is so arranged as to control the braking pressure by decreasing a vehicle body speed assumed from the wheel speeds detected by the wheel speed sensors, in accordance with a predetermined rate of changing the wheel speed, i.e. a magnitude of deceleration, on the basis of the wheel speeds detected by the wheel speed sensors at the moment of braking. More specifically, when the wheel speed is reduced to a predetermined level relative to the assumed vehicle body speed, on the one hand, the electromagnetic control valve is controlled to reduce the braking oil pressure, thereby reducing the braking pressure. When the speeds of rotation of the wheels are caused to be recovered to a predetermined extent by reducing the braking pressure and the wheel speeds are returned to a predetermined level relative to the assumed vehicle body speed, on the other hand, the electromagnetic control valve is controlled to increase the braking oil pressure, thereby elevating the braking pressure. Such a series of the control is generally referred to as "ABS control". By continuing the ABS control, for example, up to a halt of the automotive vehicle, the vehicle speed is reduced at a predetermined gradient, thereby suppressing the wheels from being locked or skidded at the moment when the wheels are rapidly braked and, as a consequence, allowing the vehicle body to halt in a short braking distance without losing directional stability of the vehicle body.

In order to ensure certain control performance in the ABS control, the assumed vehicle body speed is set by postulating a high friction coefficient $\mu$ on road surface and is so arranged as to be reduced. Hence, when the ABS control is performed during running on a road having a low friction coefficient $\mu$, such as a wet road, changes of the braking pressure are likely to appear in a keen way, thereby causing the wheel to be locked or skidded.

In order to avoid this problem, Japanese Patent Laid-open Publication (kokai) No. 194,647/1983 discloses technology which involves decreasing a rate of reducing the assumed vehicle body speed when the period of time for reducing the braking oil pressure has become longer than a predetermined period of time. This arrangement enables appropriate control of the braking pressure in accordance with the state of the road surface because the assumed vehicle body speed is allowed to be reduced at a gradient corresponding to the road surface having a low friction coefficient $\mu$, when the period of time required for reducing the braking pressure becomes longer than the predetermined period of time.

It is to be noted, however, that the technology as disclosed in the above prior Japanese patent publication may have the following problem. The ABS control is performed by renewing the assumed vehicle body speed to a new assumed vehicle body speed in order to correspond to the wheel speed when the wheel speed becomes faster than the assumed vehicle body speed. However, when the automotive vehicle is running on a road having a particularly low friction coefficient, such as an ice-covered road, the wheel is likely to be locked before the wheel speed is returned to the assumed vehicle body speed, thereby causing no assumed vehicle body speed to be renewed to a higher value coming closer to the actual vehicle body speed.

If such a phenomenon would occur in a continuous way, the assumed vehicle body speed is constantly reduced at a predetermined magnitude of deceleration and, as a consequence, the difference between the actual vehicle speed, i.e. actual vehicle body speed, and the assumed vehicle body speed becomes larger as time elapses, thereby causing the assumed vehicle body speed to be reduced to too low a level relative to the actual vehicle body speed at the moment when the ABS control has been finished.

SUMMARY OF THE INVENTION

The object of the present invention is to provide an anti-skid brake system for an automotive vehicle so adapted as to suppress the wheel from being locked or skidded due to the state in which the assumed vehicle body speed becomes too low relative to the actual vehicle body speed. i.e. to cause no so-called "cascade locking".

In order to achieve the aforesaid object, the present invention consists of an anti-skid brake system for an automotive vehicle, wherein the control to increase the braking oil pressure is inhibited when the state is detected in which the wheel is incipiently locked before the wheel speed is returned to the assumed vehicle body speed.

More particularly, the anti-skid brake system according to the present invention is characterized by wheel speed detecting means for detecting a speed of rotation of each wheel independently;

braking oil pressure adjusting means for adjusting braking oil pressure for a hydraulic brake unit for applying a braking force to each wheel;

assumed vehicle body speed determining means for determining an assumed vehicle body speed based on a wheel speed of each wheel detected by the wheel speed detecting means;

braking oil pressure controlling means for controlling the braking oil pressure adjusting means so as to periodically increase or decrease the braking oil pressure at the moment of braking, on the basis of a comparison between the wheel speed detected by the wheel speed detecting means and the assumed vehicle body speed determined by the assumed vehicle body speed means;

locking-state detecting means for detecting a state of incipiently locking the wheel at the moment of braking before the wheel speed is returned to the assumed vehicle body speed determined by the assumed vehicle body speed determining means; and inhibition means for inhibiting the braking oil pressure from increasing when the state of incipiently locking the wheel is detected by the locking-state detecting means.

As the anti-skid brake system according to the present invention can inhibit the braking oil pressure from being increased when the state is detected in which the wheel is incipiently locked before the wheel speed is returned to the assumed vehicle body speed, the assumed vehicle body speed is prevented from being decreased too low, i.e. the so-called cascade locking is suppressed from occurring, by ensuring the state in which the wheel speed is returned to the assumed vehicle body speed with certainty. This can prevent the wheel from being locked due to an excessive decrease in the assumed vehicle body speed relative to the actual vehicle body speed.

The state in which the wheel is incipient to lock before the return of the wheel speed to the assumed vehicle body speed can be detected by various procedures.

For example, first, the such state can be detected when the magnitude of deceleration of the wheel becomes a value equal to or lower than a predetermined value, i.e. when the magnitude of deceleration thereof is small, at the point in time when the period of time for adding up signals for increasing the braking oil pressure has reached a predetermined period of time. This procedure can inhibit the pressure from being increased in an intermediate time during the course of increasing the pressure.

The second procedure involves detecting the state when a first control cycle immediately after the start of the control is transferred to a second control cycle and inhibiting the braking oil pressure from being increased in the second control cycle. It is to be noted herein that, as the left-hand and right-hand rear wheels are generally controlled in an integrated fashion, an increase in the braking oil pressure for both of the left-hand and right-hand rear wheels is inhibited in the second control cycle. On the other hand, the left-hand and right-hand front wheels are controlled separately from each other, so that it is sufficient to inhibit the increase of the braking oil pressure during the second control cycle only for the front wheel that has reached the second control cycle earlier than the other.

As a third procedure, the state can be detected when the friction coefficient $\mu$ on a road surface is small. For example, when several stages of the friction coefficients $\mu$ on a road surface are preset and the increase in the braking oil pressure is inhibited in the second control cycle when the friction coefficient is found as the lowest among the preset friction coefficients $\mu$.

It is further preferred to release the inhibition of the braking oil pressure from being increased when predetermined conditions are met in order to prevent the braking force from becoming short due to the inhibition of the increase in the braking oil pressure.

The condition for releasing the inhibition for increasing the braking oil pressure is basically such that no acceleration is implemented, preferably such that the wheels are decelerated. It is postulated that no wheel is incipient to lock even if the inhibition for increasing the braking oil pressure is released when the friction coefficient $\mu$ on the road surface is high, in such a state that the wheels are to be decelerated due to resistance to the road surface. It is preferred to further add the condition that a ratio of the wheel speed of the rear wheel to the assumed vehicle body speed reaches a value equal to or higher than a predetermined value because the rear wheels originally vary in their wheel speeds to a lesser extent than the wheel speeds of the front wheels.

Other objects, features and advantages of the present invention will become apparent in the course of the description of the preferred embodiments, which follows, with reference to the accompanying drawings.

DETAILED DESCRIPTION OF THE PREFERRED EMBODIMENTS

Figure 1:
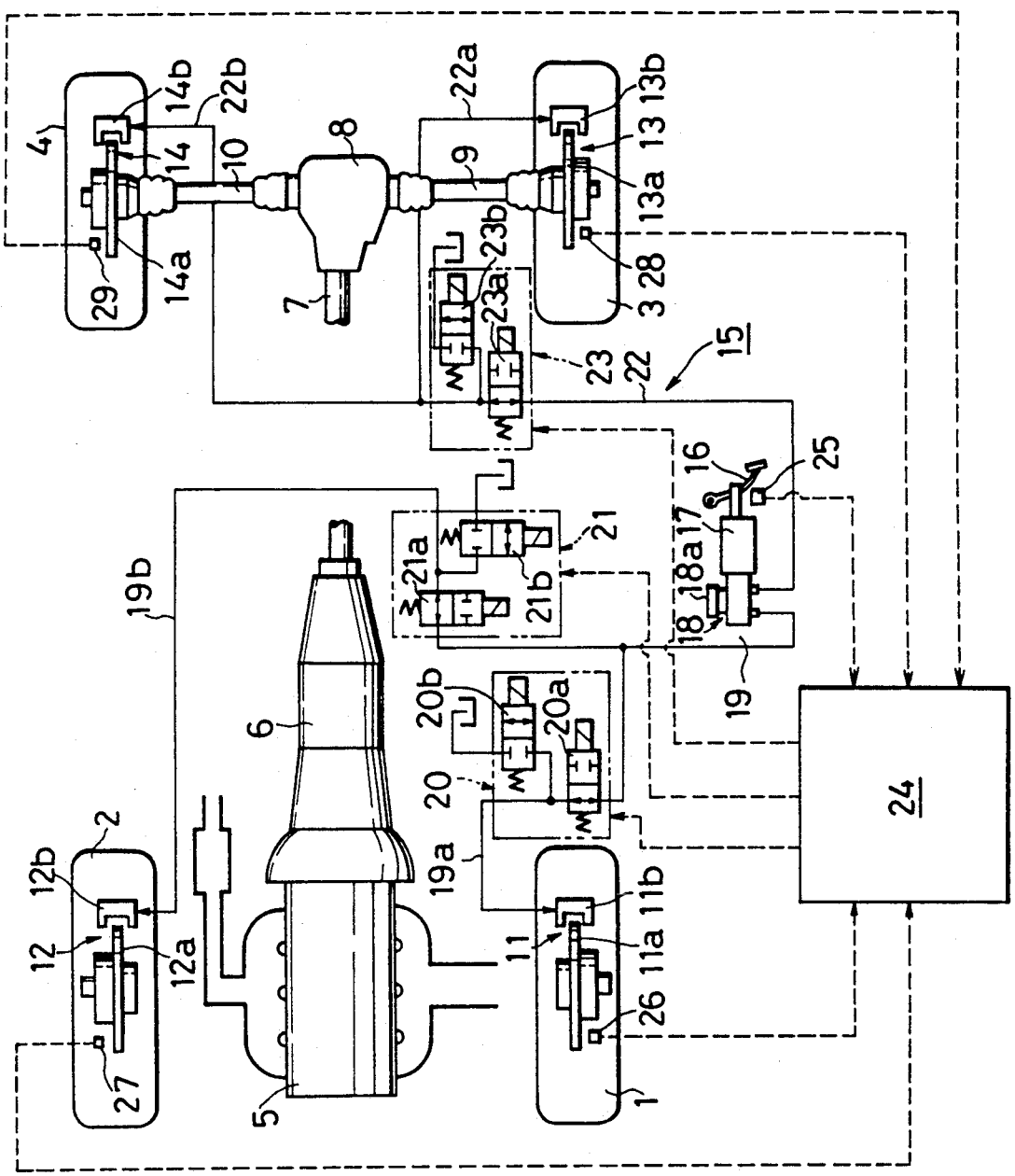
FIG. 1 is a schematic representation showing an outline of the anti-skid brake system according to an embodiment of the present invention.

As shown in FIG. 1, reference numeral 1 stands for a left-hand front wheel, reference numeral 2 for a right-hand front wheel, reference numeral 3 for a left-hand rear wheel and reference numeral 4 for a right-hand rear wheel. The output torque of an engine 5 is transmitted through a transmission 6, a propeller shaft 7 and a differential 8 to a left-hand driving shaft 9 and a right-hand driving shaft 10, through which the output torque is transmitted to the left-hand rear wheel 3 and the right-hand rear wheel 4, respectively.

Mounted to the wheels 1, 2, 3 and 4 are braking units 11, 12, 13 and 14, respectively, which have disks 11a, 12a, 13a and 14a arranged so as to be rotatable integrally with the respective wheel and calipers 11b, 12b, 13b and 14b for braking the rotation of the disks 11a, 12a, 13a and 14a, respectively. Further, there is provided a brake controlling system 15 for braking the braking units 11, 12, 13 and 14.

The brake controlling system 15 has a servo-mechanism 17 for increasing a force for depressing a braking pedal 16 and a master cylinder 18 for generating braking pressure in proportion to the depressed force increased by the servo-mechanism 17. A braking-pressure supplying line 19 for the front wheels led from the master cylinder 18 branches into two branch lines, i.e. a braking-pressure supplying left-hand branch line 19a for the left-hand front wheel 1 and a braking-pressure supplying right-hand branch line 19b for the right-hand front wheel 2, which in turn are connected to the calipers 11b and 12b of the braking units 11 and 12 for the left-hand and right-hand front wheels 1 and 2, respectively.

Mounted to the braking-pressure supplying left-hand branch line 19a connected to the braking unit 11 for the left-hand front wheel 1, on the one hand, is a first valve unit 20 consisting of an opening-closing valve 20a of an electromagnetic type and a relief valve 20b of an electromagnetic type. Mounted to the braking-pressure supplying right-hand branch line 19b connected to the braking unit 12 for the right-hand front wheel 2, on the other hand, is a second valve unit 21 consisting of an opening-closing valve 21a of an electromagnetic type and a relief valve 21b of an electromagnetic type, like the first valve unit 20.

On the other hand, a braking-pressure supplying line 22 which leads from the master cylinder 18 is provided with a third valve unit 23 consisting of an opening-closing valve 23a of an electromagnetic type and a relief valve 23b of an electromagnetic type, like the first and second valve units 20 and 21. The braking-pressure supplying line 22 further branches on the side downstream of the third valve unit 23 into two branch lines, i.e. a braking-pressure supplying left-hand branch line 22a for the left-hand rear wheel 3 and a braking-pressure supplying right-hand branch line 22b for the right-hand rear wheel 4, which in turn are connected to the calipers 13b and 14b of the braking units 13 and 14 for the left-hand and right-hand rear wheels 3 and 4, respectively. In other words, the brake controlling system 15 in this embodiment has a first channel for implementing variable control of the braking pressure of the braking unit 11 for the left-hand front wheel 1 by operating the first valve unit 20, a second channel for implementing variable control of the braking pressure of the braking unit 12 for the right-hand front wheel 2 by operating the second valve unit 21, and a third channel for implementing variable control of the braking pressure of the braking units 13 and 14 for the left-hand and right-hand rear wheels 3 and 4, respectively, by operating the third valve unit 23. The first, second and third channels are so arranged as to be controlled separately and independently from each other.

The brake controlling system 15 has a control unit 24 for controlling the first, second and third channels. Entered into the control unit 24 are braking signals from a brake switch 25 for sensing the ON/OFF state of a braking pedal 16 and signals indicative of speeds of rotation of each of the wheels from respective wheel speed sensors 26, 27, 28 and 29. In response to the signals entered, the control unit 24 generates braking-pressure controlling signals to the first, second and third valve units 20, 21 and 23, respectively, thereby implementing the control for suppressing a slip of each of the wheels 1, 2, 3 and 4, that is, thereby implementing the ABS control over each of the first, second and third channels in a parallel manner. In other words, the control unit 24 opens or closes the opening-closing valves 20a, 21a and 23a and the relief valves 20b, 21b and 23b for the first, second and third valve units 20, 21 and 23 by duty control in response to the wheel speeds indicated by the wheel speed signals from the wheel speed sensors 26, 27, 28 and 29, respectively, thereby applying the braking pressure to the respective front wheels 1 and 2 as well as rear wheels 3 and 4 in accordance with the state of the slip. A braking oil discharged from each of the relief valves 20b, 21b and 23b of the respective first, second and third valve units 20, 21 and 23 is returned to a reserve tank 18a of the master cylinder 18 through a drain line (not shown).

In such a state that no ABS control is implemented, no signals for controlling the braking pressure are generated from the control unit 24, so that the relief valves 20b, 21b and 23b of the respective first, second and third valve units 20, 21 and 23 are kept closed, while the opening-closing valves 20a, 21a and 23a for the respective valve units 20, 21 and 23 are kept open, as shown in the drawing. This arrangement for the opening-closing valves and the relief valves allows the braking pressure generated by the master cylinder 18 in proportion to the force created by depressing the braking pedal 16 to be supplied to the braking units 11 and 12 for the left-hand and right-hand front wheels 1 and 2 through the braking-pressure supplying line 19 for the front wheels and to the braking units 13 and 14 for the left-hand and right-hand rear wheels 3 and 4 through the braking-pressure supplying line 22 for the rear wheels. This applies the braking oil pressure directly to the front wheels 1 and 2 as well as the rear wheels 3 and 4 in proportion to the braking pressure supplied to the braking units 11, 12, 13 and 14, respectively.

Outline of Control over Brakes

Description will now be made of an outline of control over the brakes by the control unit 24.

The control unit 24 computes the magnitude of acceleration or deceleration for each wheel on the basis of the wheel speeds indicated by the signals from the wheel speed sensors 26, 27, 28 and 29. The procedure of computing the magnitude of acceleration or deceleration comprises subtracting the current wheel speed from the previous wheel speed and dividing the difference between the current and previous wheel speeds with a sampling cycle $\Delta t$ (for example, 7 ms). The results are then cycle translated into the magnitude of gravity acceleration which is then renewed as the current magnitude of acceleration or deceleration.

The control unit 24 further determines if the road surface on which the automotive vehicle is running is bad or good by implementing the procedure of processing the state of the road surface. This processing may be implemented by the control unit 24 by maintaining a flag $F_{AKRO}$ for determining the bad road to "O", on the one hand, when the count of the magnitude of acceleration or deceleration of each of, for example, the rear wheels 3 and 4 over a predetermined upper limit or below a predetermined lower limit within a predetermined period of time is smaller than a preset value and by setting the flag $F_{AKRO}$ to "1", on the other hand, when the count of the magnitude of acceleration or deceleration of each of the rear wheels 3 and 4 over the predetermined upper limit or below the predetermined lower limit is equal to or larger than the preset value, as it is determined that the automotive vehicle is running on a bad road surface.

It is to be noted herein that the control unit 24 selects either one of the rear wheels 3 and 4 as representing the wheel speeds and the magnitude of acceleration or deceleration for the third channel. In this embodiment, with a detecting error upon detection of a slip by the wheel speed sensors 28 and 29 for the respective rear wheels 3 and 4 taken into account, the wheel speed of the rear wheel having the smaller wheel speed is selected as the wheel speed for the rear wheels and the magnitude of the acceleration or deceleration given from the representative wheel speed is selected as the magnitude of the acceleration or deceleration for the rear wheels.

Further, the control unit 24 assumes the friction coefficients $\mu$ on the road surface for each of the first, second and third channels, and simultaneously calculates the assumed vehicle body speed of the automotive vehicle.

The control unit 24 calculates a slip ratio for each of the first, second and third channels on the basis of the wheel speed for the rear wheels given from the signals from the wheel speed sensors 28 and 29 and the wheel speeds of the front wheels 1 and 2 indicated by the signals from the wheel speed sensors 26 and 27 as well as the assumed vehicle body speed determined by the following relationship:

Slip ratio=

(wheel speed/assumed vehicle body speed)×100%

In other words, the slip ratio becomes smaller as a deviation of the wheel speed relative to the assumed vehicle body speed gets larger, thereby increasing the tendency in which the wheel slips or spins, i.e. the tendency of locking the wheel.

Description will now be made of the processing for setting control threshold values to be employed for controlling the first, second and third channels by the control unit 24.

The control threshold values are set by the control unit 24, for example, by selecting control threshold values corresponding to the friction coefficient value and the assumed vehicle body speed from various control threshold values preset in accordance with the wheel speed region and the friction coefficients $\mu$ on road surfaces and by correcting the control threshold values in accordance with the results, for example, determined by the procedures of processing to determine if the automotive vehicle is running on a bad road surface. It is to be noted herein that the control threshold values may contain control threshold value $B_{02}$, indicating the "O-2 deceleration" for determining the shift from phase O indicative of the state in which no ABS control is implemented to phase II indicative of the state in which the braking pressure is held after it has been increased, control threshold value $B_{12}$, indicating the "1-2 deceleration" for determining the shift from phase I indicative of the state in which the braking pressure is increased to the phase II, control threshold value $B_{23}$ indicating the "2-3 deceleration" for determining the shift from the phase II to phase III indicative of the state in which the braking pressure is decreased, control threshold value $B_{24}$ indicating the "2-4 deceleration" for determining the shift from the phase II to phase IV indicative of the state in which the braking pressure is rapidly decreased, control threshold value $B_{35}$ indicating the "3-5 deceleration" for determining the shift from the phase III to phase V indicative of the state in which the braking pressure is held after it has been decreased, control threshold value $B_{51}$ indicating the "5-1 deceleration" for determining the shift from the phase V to the phase I. These control threshold values are set in accordance with the vehicle speed region and the friction coefficients $\mu$ on road surface. In this case, the control threshold values for deceleration that exert the influence upon the braking force are so set as to approach to OG as the friction coefficient $\mu$ becomes smaller, in order to achieve both high braking performance at a high friction coefficient $\mu$ and control responsiveness at a low friction coefficient $\mu$.

For each of the second and third channels, the control threshold values are set in substantially the same manner as for the first channel.

An example of the control threshold values is shown in the following table:

| Road Surface Friction Coefficient $\mu$ | Phases (Threshold Values) | | | | |
|---|---|---|---|---|---|
| | $1 \rightarrow 2$ | $2 \rightarrow 3$ $5 \rightarrow 1$ | $3 \rightarrow 5$ | $2 \rightarrow 4$ | $0 \rightarrow 2$ |
| 1 (Low) | −0.5G | 95% | 0G | 90% | −1.5G |
| 2 (Medium) | −1.0G | 90% | −0.2G | 85% | −1.5G |
| 3 (High) | −1.5G | 85% | −0.5G | 80% | −1.5G |

The control unit 24 further implements the processing for determining for each channel if the wheel has the tendency of being likely to be locked or incipient to be locked. Description will be made on the processing for determining for the first channel if the wheel is incipiently locked, as an example because each of the second and third channels can be processed in substantially the same manner as the first channel. The control unit 24 sets the current value of a continuing flag $F_{CON1}$ for the first channel as the previous value, followed by making a decision to determine if the assumed vehicle body speed $V_R$ and the wheel speed W1 satisfy predetermined conditions (for example, assumed vehicle body speed $V_R<5$ Km per hour; wheel speed W1<7.5 km per hour). When these conditions are met, on the one hand, then the continuing flag $F_{CON1}$ and a locking flag $F_{LOK1}$ are reset to "0". When these conditions are not satisfied, on the other hand, it is decided to determine if the locking flag $F_{LOK1}$ is set to "1". If the locking flag $F_{LOK1}$ is not set to "1", then the locking flag $F_{LOK1}$ is set to "1" under predetermined conditions, for example, under the condition that the assumed vehicle body speed $V_R$ is faster than the wheel speed W1.

Given the condition that it is decided by the control unit 24 that the locking flag $F_{LOK1}$ is set to "1", the continuing flag $F_{CON1}$ is set to "1" when the phase has reached phase I for the first time. For instance, when the road surface friction coefficient $\mu$ is set to "2" on the above table, the continuing flag $F_{CON1}$ is set to "1" at the moment when the slip ratio S1 becomes larger than 90% in such a state that the phase value P1 of the first channel is set to "5" indicative of phase V.

The processing of determining for each of the second and third channels if the wheel has the tendency of being locked can be implemented in substantially the same manner as for the first channel, so that description on the processing for the second and third channels is omitted from the following description for brevity of explanation.

Furthermore, the control unit 24 implements the processing for determining the phases for controlling the control quantities for the first, second and third valve units 20, 21 and 23. This processing is implemented in such a manner that, on the basis of a comparison between the control threshold values set in accordance with the state in which the automotive vehicle is driven and the magnitude of acceleration or deceleration or the slip ratios of the wheels, the control unit 24 selects phase 0 indicative of the state in which no ABS control is implemented, phase I indicative of the state in which the braking pressure is increased at the moment of the ABS control, phase II indicative of the state in which the braking pressure is held at an increased level after it has been increased, phase III indicative of the state in which the braking pressure is increased, phase IV indicative of the state in which the braking pressure is rapidly decreased, or phase V indicative of the state in which the braking pressure is held at a reduced level after it has been decreased.

The control unit 24 then sets control quantities in accordance with the phase value set for each of the channels, followed by generating the signals for controlling the braking pressure in accordance with the control quantities to the first, second and third valve units 20, 21 and 23, thereby increasing or decreasing or holding the braking pressure at a certain level after it has been increased or decreased, and a braking pressure within the braking-pressure supplying branch lines 19a and 19b for the front wheels and within the braking-pressure supplying branch lines 22a and 22b for the rear wheels, each disposed on the downstream side of each of the first, second and third valve units 20, 21 and 23.

Assumption of Road Surface Friction Coefficient $\mu$

Figure 2:
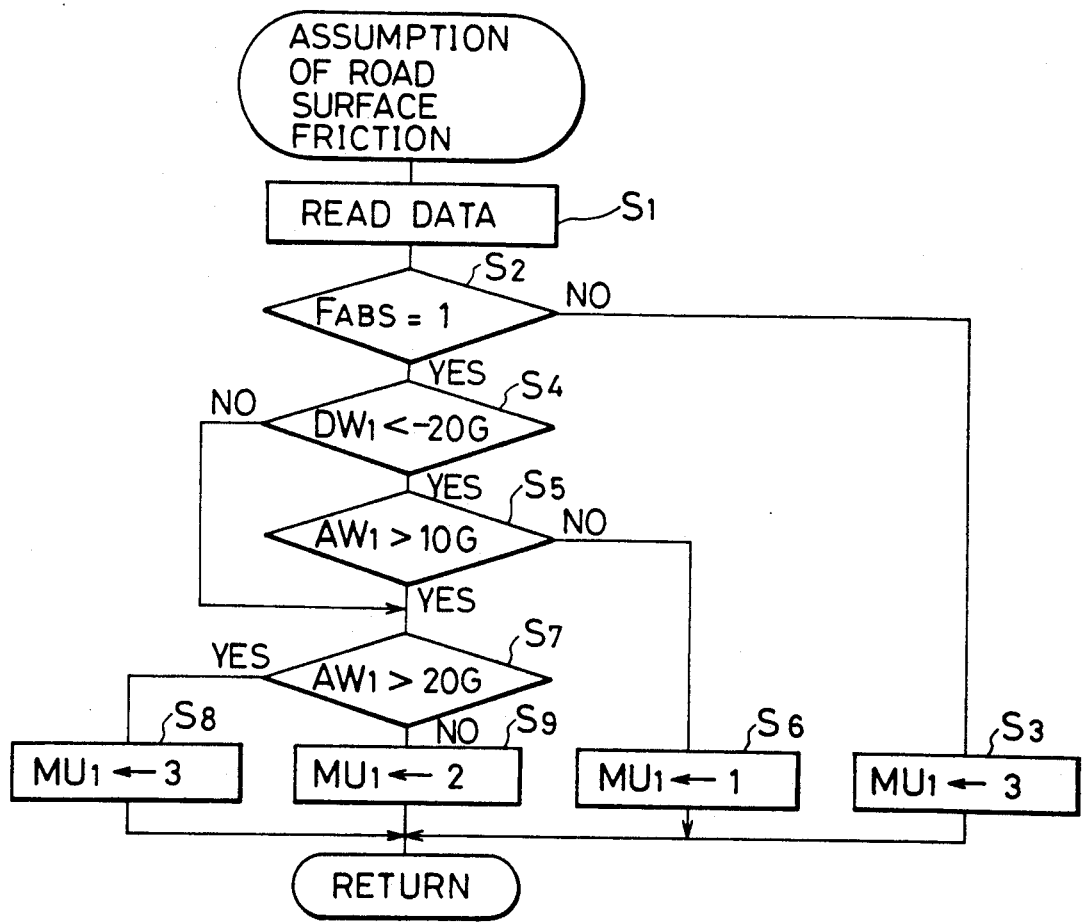
FIG. 2 is a flowchart showing the procedure of processing for assuming the friction coefficient $\mu$ on a road surface.

In addition, the control unit 24 implements the processing for assuming the road surface friction coefficient $\mu$ and this processing will be described with reference to the flow chart as shown in FIG. 2.

First, at step S1, the control unit 24 reads various data, followed by proceeding to step S2 at which a decision is made to determine if the ABS flag $F_{ABS}$ is set to "1", i.e. if the ABS control is in progress. It is noted that the ABS flag $F_{ABS}$ is set to "1" when either one of locking flag $F_{LOK1}$, flag $F_{LOK2}$ and flag $F_{LOK3}$ for the respective first, second and third channels is set to "1" and that the ABS flag $F_{ABS}$ is reset to "0" when the braking switch has shifted from its ON state to its OFF state. When it is decided at step S2 that the ABS flag $F_{ABS}$ is not set to "1", then the program flow goes to step S3 at which the control unit 24 sets a road surface friction coefficient value MU1 to "3" indicative of a road surface having a high friction coefficient $\mu$.

On the other hand, when the result of decision at step S2 indicates that the ABS flag $F_{ABS}$ is set to "1", it is determined that the ABS control is in progress so that a decision is made at step S4 to determine if the wheel deceleration DW1 (DW1<0) in the previous cycle is smaller than $-20G$. When it is decided at step S4 that the wheel deceleration DW1 is smaller than $-20G$, on the one hand, then the program flow goes to step S5 at which a decision is further made to determine the wheel acceleration AW1 (AW1>0) in the previous cycle is larger than 10G. When it is decided at step S5 that the wheel acceleration AW1 is not larger than 10G, then a friction coefficient value MU1 is set to "1" indicative of a low friction coefficient $\mu$.

When the result of decision at step S4 indicates that the wheel deceleration DW1 is equal to or larger than $-20G$, then the program flow goes to step S7 at which a decision is made to determine if the wheel acceleration AW1 is larger than 20G. When it is decided at step S7 that the wheel acceleration AW1 is larger than 20G, on the one hand, then the friction coefficient value MU1 is set at step S8 to "3" indicative of a high friction coefficient $\mu$. When it is decided at step S7 that the wheel acceleration AW1 is equal to or smaller than 20G, then the friction coefficient value MU1 is set at step S9 to "2" indicative of a medium friction coefficient $\mu$.

The friction coefficients $\mu$ for the left-hand and right-hand front wheels 1 and 2 are assumed separately from each other, while those for the left-hand or right-hand rear wheel 3 and 4 are determined as the friction coefficient $\mu$ for the rear wheel having a lower wheel speed.

Determination of Assumed Vehicle Body Speed

Figure 3:
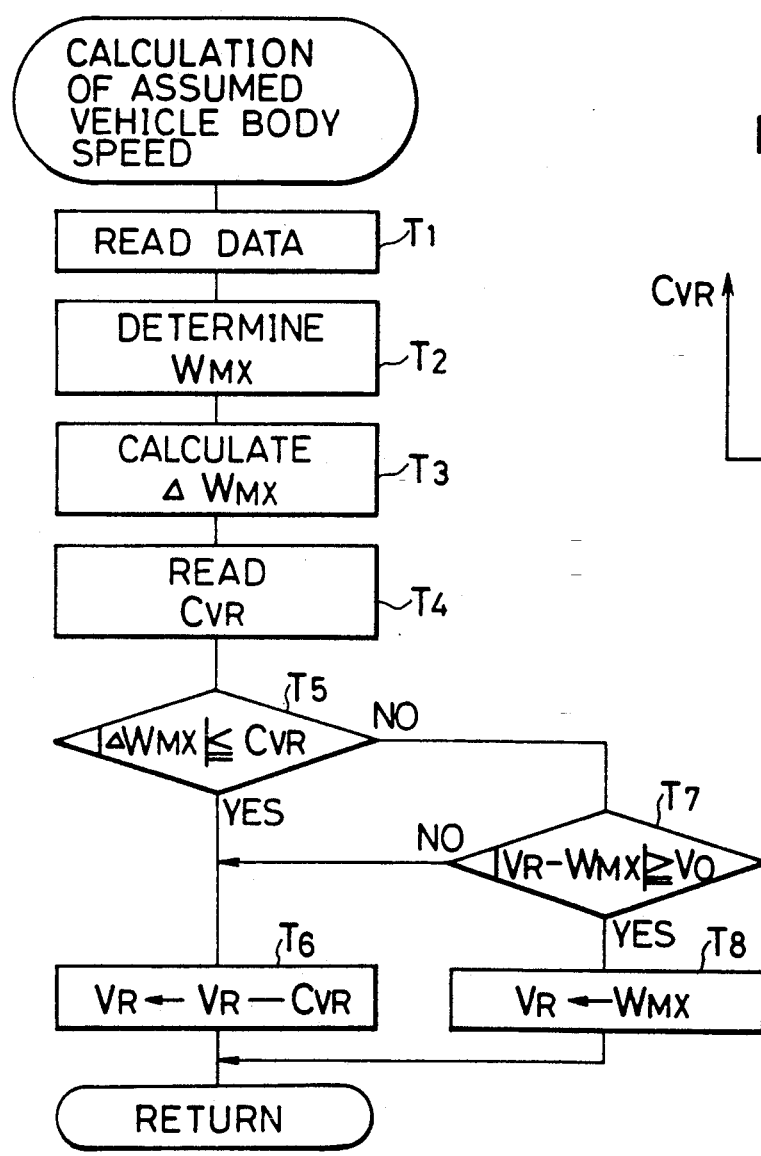
FIG. 3 is a flowchart showing the procedure of processing for calculating the assumed vehicle body speed.

Description will be made on the practices of processing the determination of the assumed vehicle body speed with reference to FIGS. 3 and 4.

First, at step T1, the control unit 24 reads various data, followed by proceeding to step T2 at which the maximum wheel speed $W_{MX}$ is determined out of the wheel speeds W1, W2, W3 and W4 indicated by the signals generated from the wheel speed sensors 26, 27, 28 and 29, respectively. Then, at step T3, there is computed a rate $\Delta W_{MX}$ of changing the wheel speed per a sampling cycle $\Delta t$ of the maximum wheel speed $W_{MX}$.

Figure 4:
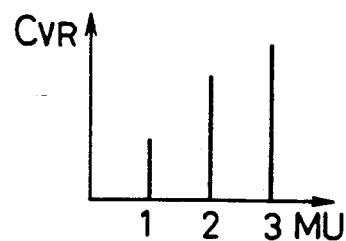
FIG. 4 is a graph showing a map to be employed for the processing for calculating the assumed vehicle body speed.
Figure 9:
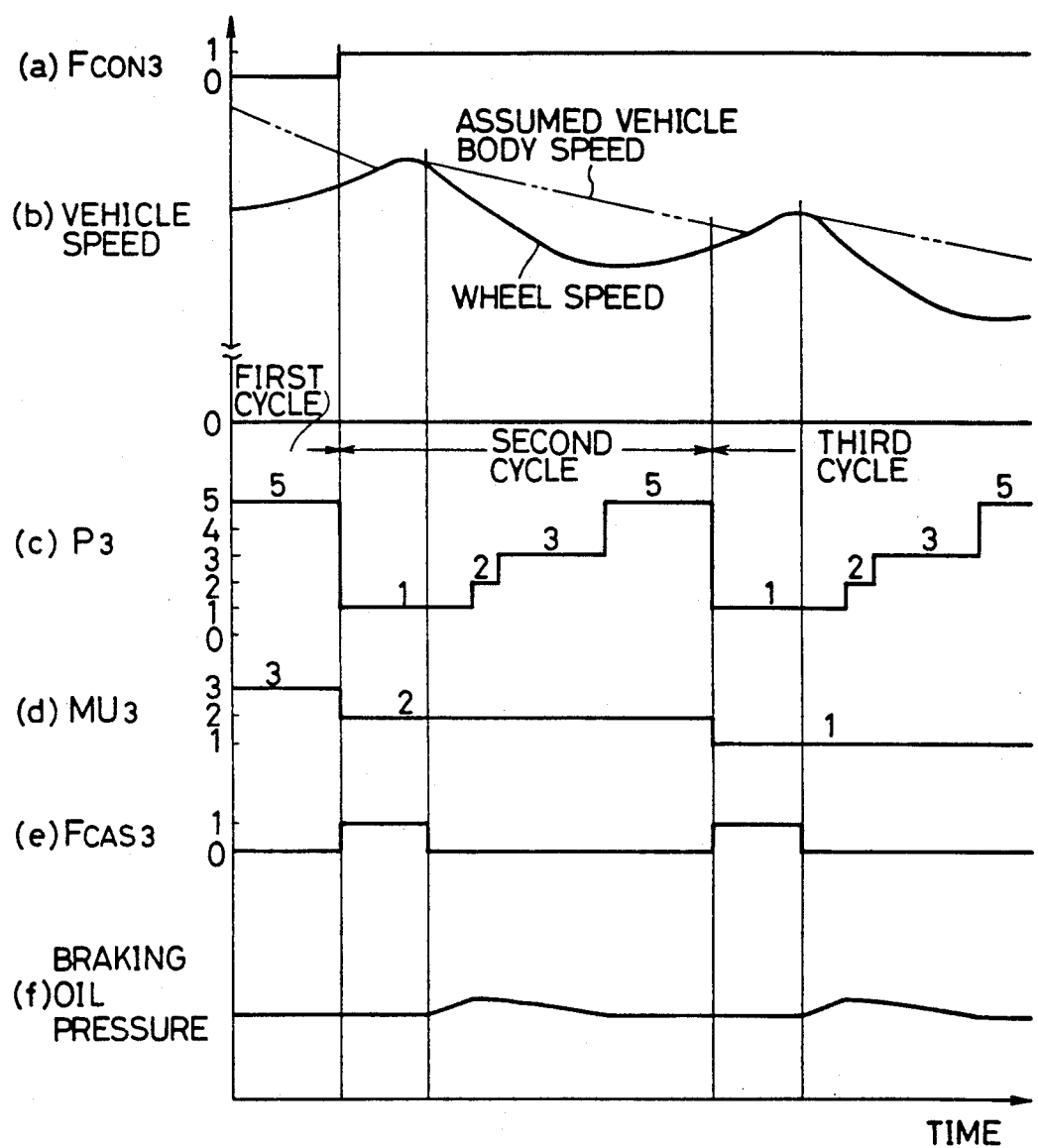

Then, at step T4, the control unit 24 computes a friction coefficient value MU from the map as shown in FIG. 4 by subjecting the friction coefficient values for each of the channels to an arithmetic mean and it then reads a correction value $C_{VR}$ for correcting the vehicle body speed corresponding to the friction coefficient value MU. It is to be noted herein that the correction value $C_{VR}$ is larger than zero and is set to become smaller as the friction coefficient $\mu$ gets smaller. Then, at step T5, a decision is made to determine if the rate $\Delta W_{MX}$ is equal to or smaller than the correction value $C_{VR}$. It is noted herein that the rate $\Delta W_{MX}$ is an absolute value. When it is decided at step T5 that the rate $\Delta W_{MX}$ is equal to or smaller than the correction value $C_{VR}$, on the one hand, then the current value is replaced at step T6 by a value obtained by subtracting the correction value $C_{VR}$ from the previous value of the assumed vehicle body speed $V_R$. Hence, the assumed vehicle body speed $V_R$ is caused to be decreased at a predetermined gradient in proportion to the correction value $C_{VR}$ for correcting the vehicle body speed, as shown in FIG. 9.

When it is decided at step T5 that the rate $\Delta W_{MX}$ is larger than the correction value $C_{VR}$, or when it is determined that the maximum wheel speed $W_{MX}$ has changes to an excessive extent, on the other hand, then the program flow goes to step T7 at which a decision is made to determine if the absolute value of a value obtained by subtracting the maximum wheel speed $W_{MX}$ from the assumed vehicle body speed $V_R$ is equal to or larger than a predetermined value Vo (Vo>0). In other words, it is determined at step T7 if there is a big gap between the maximum wheel speed $W_{MX}$ and the assumed vehicle body speed $V_R$. When it is decided at step T7 that there is no big gap between the maximum wheel speed $W_{MX}$ and the assumed vehicle body speed $V_R$, then the current value is replaced at step T6 by a value obtained by subtracting the correction value $C_{VR}$ from the previous value of the assumed vehicle body speed $V_R$.

On the other hand, when it is decided at step T7 that there is the big gap between the maximum wheel speed $W_{MX}$ and the assumed vehicle body speed $V_R$, then the maximum wheel speed $W_{MX}$ is replaced at step T8 by the assumed vehicle body speed $V_R$.

As described hereinabove, the assumed vehicle body speed $V_R$ is renewed in every sampling cycle $\Delta t$ in accordance with each of the wheel speeds W1, W2, W3 and W4.

Figure 5:
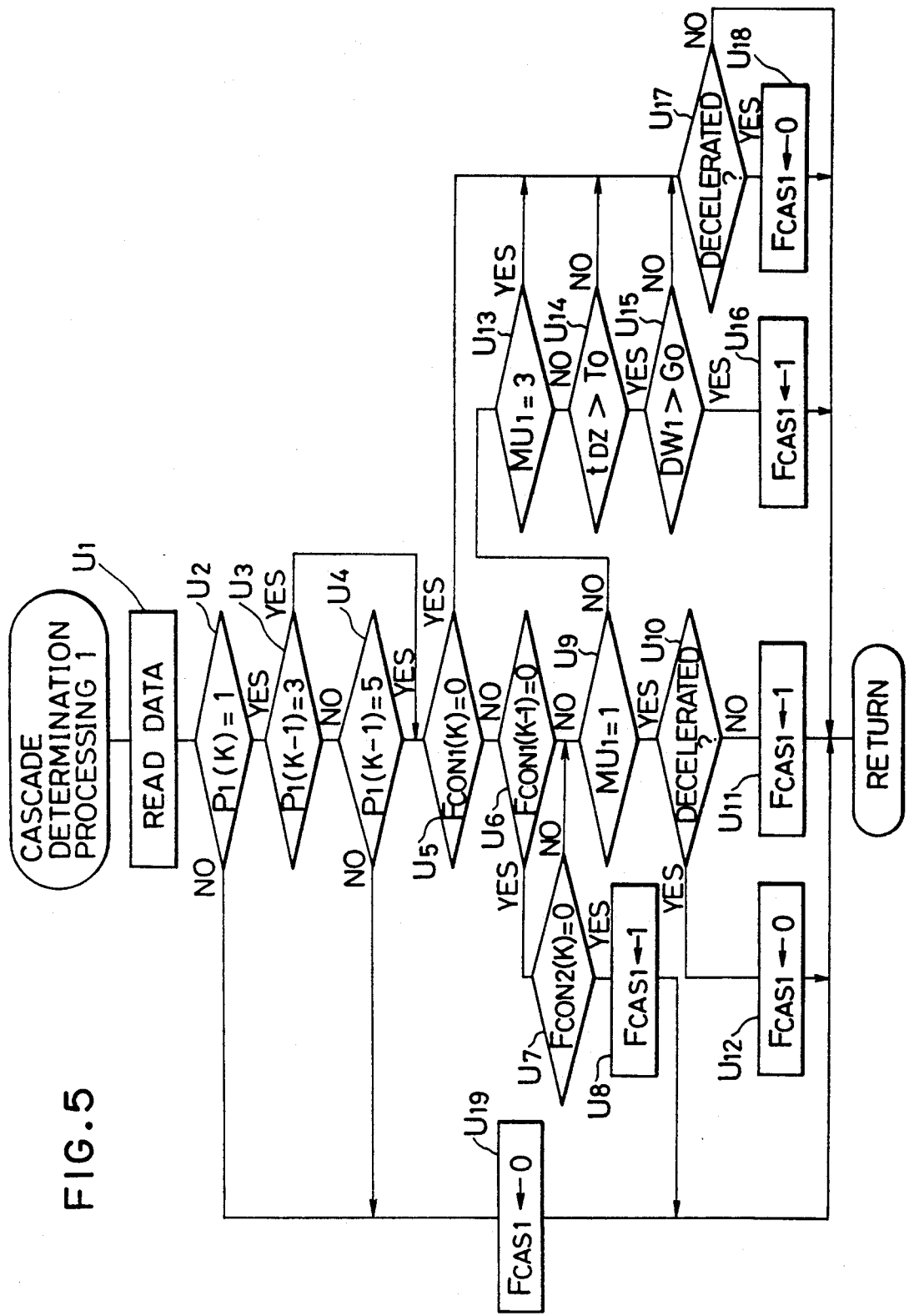
FIGS. 5 and 6 are flowcharts for the procedure of processing for cascade determination.

Processing for Determination of Cascade Locking for Front Wheels (FIG. 5)

Description will be made on the procedures for the processing for the determination of the so-called cascade locking for the left-hand front wheel in the first channel with reference to the flowchart as shown in FIG. 5, as an example, because the processing for the second channel concerning the right-hand front wheel can be implemented in substantially the same manner as the processing for the first channel. It is noted herein that the increase in the braking pressure is inhibited when a cascade flag $F_{CAS}$ is set to "1", while the inhibition of the increase in the braking pressure is released when the cascade flag $F_{CAS}$ is reset to "0".

First, at step U1, various data is read by the control unit 24, followed by proceeding to step U2 at which a decision is made to determine if the current value of the phase value P1 is set to "1" indicative of the state of increasing the braking pressure. When it is decided at step U2 that the phase value P1 is set to "1", on the one hand, then a further decision is made at step U3 to determine if the previous value of the phase value P1 is set to "3" indicating the state in which the braking pressure is reduced. When it is decided at step U3 that the phase value P1 is not set to "3", on the other hand, then a further decision is made at step U4 to determine if the previous value of the phase value P1 is set to "5" indicating the state in which the braking pressure is held after it has been reduced.

When the results of decisions at steps U3 and U4 are found in the affirmative, then the program flow goes to step U5 at which a decision is made to determine if the current value of the continuing flag $F_{CON1}$ is set to "0". When it is decided at step U5 that the continuing flag $F_{CON1}$ is set to "1", on the one hand, then the program flow goes to step U6 at which a further decision is made to determine if the previous value of the flag $F_{CON1}$ was set to "0". In other words, it is determined if the first channel has been shifted to the second cycle from the first channel immediately after the start of the control. When the result of decision at step U6 indicates that the previous value of the flag $F_{CON1}$ was set to "0", then the program flow goes to step U7 at which a decision is made to determine if a continuing flag $F_{CON2}$ for the second channel for the right-hand front wheel 2 is set to "0". In other words, it is determined if the first channel has been shifted to the second cycle first. When the result of decision at step U7 indicates that the continuing flag $F_{CON2}$ is set to "0", then the program flow goes to step U8 at which a cascade flag $F_{CAS1}$ for the first channel is set to "1", thereby allowing the cascade flag $F_{CAS1}$ to be forcibly set to "1", regardless of the value of the friction coefficient value MU1, when the first channel has been shifted to the second cycle first.

On the other hand, when it is decided at step U6 that the previous value of the continuing flag $F_{CON1}$ is not set to "0", then the friction coefficient value MU1 is decided at step U9 to determine if it is set to "1" because the control cycle has been determined as the second cycle or thereafter. When the result of decision at step U9 is in the affirmative, it is decided that the friction coefficient $\mu$ is low so that a decision is made at step U10 to determine if the left-hand front wheel 1 is being decelerated. If it is decided at step U10 that the left-hand front wheel 1 is not decelerated, on the one hand, then the program flow goes to step U11 at which the cascade flag $F_{CAS1}$ is set to "1". When it is decided at step U11 that the left-hand front wheel 1 is decelerated, on the other, then the cascade flag $F_{CAS1}$ is cleared to "0".

When it is decided at step U9 that the friction coefficient value MU1 is not set to "1", then the control unit 24 makes a decision at step U13 to determine if the friction coefficient value MU1 is set to "3" indicative of a high friction coefficient $\mu$. When the result of decision at step U13 indicates that the friction coefficient value MU1 is not set to "3", i.e. that the friction coefficient value MU1 is set to "2" indicative of the medium friction coefficient $\mu$ on road surface, then step U14 is implemented to make a decision to determine if the total running period of time for subjecting the opening-closing value 20a for the first valve unit 20 in the first channel to duty control, i.e. the running period of time $t_{DZ}$ for implementing the increase of the braking pressure, has reached a predetermined value To (for example, 25 ms). When the period of time $t_{DZ}$ is determined at step U14 to be larger than the predetermined value To, it is decided at step U15 to determine if the rear deceleration DW1 (DW1<0) is larger than a predetermined value Go (for example, 4G). when the result of decision at step U15 indicates that the deceleration DW1 is larger than the predetermined value Go, then the program flow goes to step U16 at which the cascade flag $F_{CAS1}$ is set to "1". This is to avoid the increase in the braking pressure to an excessive extent due to facilitating the increase in the braking oil pressure or to controlling the increase in the braking oil pressure in such a manner as incipiently locking the wheel as a result of determination of the friction coefficient value MU1 as the high friction coefficient $\mu$ because the initial value of the braking oil pressure is apparently so low that the period of time for increasing the braking oil pressure becomes longer.

When the result of decision at step U15 indicates that the deceleration DW1 is equal to or larger than the predetermined value To, it is decided at step U17 to determine if the left-hand front wheel 1 is being decelerated. Then the cascade flag $F_{CAS1}$ is cleared to "0" at step U18 when it is decided at step U17 that the left-hand front wheel 1 is being decelerated.

On the other hand, when it is decided at steps U2 and U4 that neither the current value of the phase value P1 is set not to "1" nor the previous value thereof is not to "3", respectively, the cascade flag $F_{CAS1}$ is cleared to "0" at step U19.

The processing for the determination for the cascade locking for the second channel for the right-hand front wheel 2 is implemented in substantially the same manner as for the first channel for the left-hand front wheel 1 as described immediately hereinabove.

Figure 6:
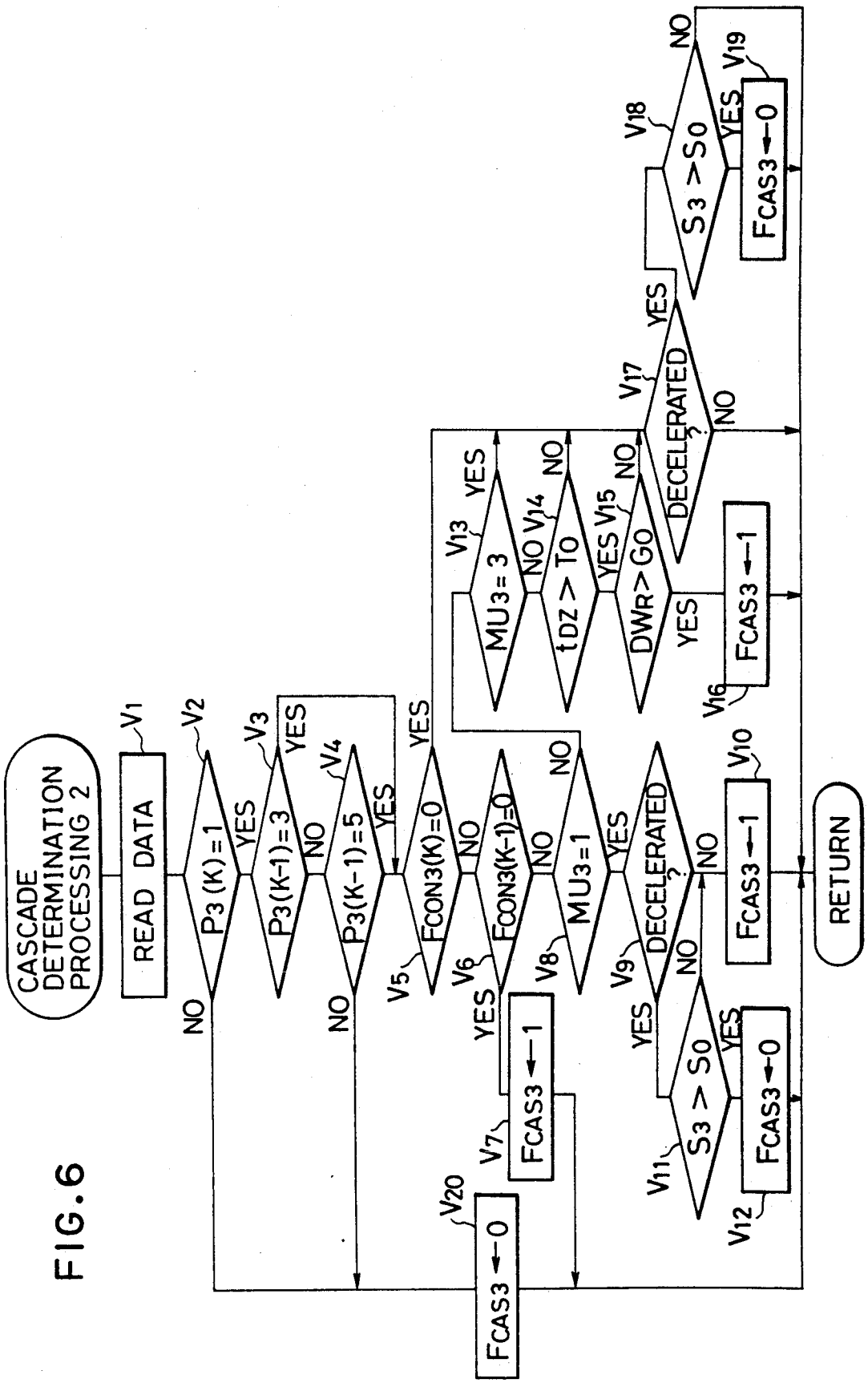

Processing for Determination of Cascade Locking for Rear Wheels (FIG. 6)

Description will be made on the procedures for the processing for the determination of the so-called cascade locking for the rear wheels in the third channel with reference to the flow chart as shown in FIG. 6.

First, at step V1, various data is read by the control unit 24, followed by proceeding to step V2 at which a decision is made to determine if the current value of the phase value P3 is set to "1" indicative of the state of increasing the braking pressure. When it is decided at step V2 that the phase value P3 is set to "1", on the one hand, then a further decision is made at step V3 to determine if the previous value of the phase value P3 is set to "3" indicating the state in which the braking pressure is reduced. When it is decided at step V3 that the phase value P3 is not set to "1", on the other hand, then a further decision is made at step V4 to determine if the previous value of the phase value P3 is set to "5" indicating the state in which the braking pressure is held at a reduced level after it has been reduced.

When the results of decisions at steps V3 and V4 indicate that the previous value of the phase value P3 is set to "3" or the previous value of the phase value P3 is set to "5", respectively, then the program flow goes to step V5 at which a decision is made to determine if the current value of the continuing flag $F_{CON3}$ is set to "0". When it is decided at step V5 that the continuing flag $F_{CON3}$ is set to "1", on the one hand, then a further decision is made at step V6 to determine if the previous value of the continuing flag $F_{CON3}$ was set to "0". In other words, it is determined if the third channel has been shifted to the second cycle from the first channel immediately after the start of the control. When the result of decision at step V6 indicates that the previous value of the flag $F_{CON1}$ was set to "0", then a cascade flag for the third channel is set at step V7 to "1", thereby allowing the cascade flag $F_{CAS3}$ to be forcibly set to "1", regardless of the value of the friction coefficient value MU3, when the third channel has been shifted to the second cycle first.

On the other hand, when it is decided at step V6 that the previous value of the continuing flag $F_{CON3}$ is not set to "0", i.e. that the third channel has been shifted to the second cycle or thereafter, a further decision is made at step V8 to determine if the friction coefficient value MU3 is set to "1". When the result of decision at step V8 indicates that the friction coefficient value MU3 is set to "1", i.e. that the friction coefficient value MU3 indicates a low friction coefficient $\mu$, then the program flow goes to step V9 at which a decision is made to determine if the rear wheels 3 and 4 are being decelerated. When it is decided at step V9 that the rear wheels 3 and 4 are not being decelerated, on the one hand, the cascade flag $F_{CAS3}$ is set to "1" at step V10. When it is decided at step V9 that the rear wheels 3 and 4 are being decelerated, on the other hand, then the program flow goes to step V11 at: which a decision is made to determine if a slip ratio S3 for the third channel is larger than a predetermined value SO (for example, 98%). Then, at step V12, the cascade flag $F_{CAS3}$ is cleared to "0" when the result of decision at step V11 indicates that the slip ratio S3 is equal to or smaller than the predetermined value SO.

On the other hand, when the control unit 24 determines at step V8 that the friction coefficient value MU3 is not set to "1", a further decision is made at step V13 to determine if the friction coefficient value MU3 is set to "3". When it is decided at step V13 that the friction coefficient value MU3 is not set to "3", i.e. that the friction coefficient value MU3 is set to "2" indicating a medium friction coefficient a further decision is made at step V14 to determine if the total run period of time for which the opening-closing valve 23a of the third valve unit 23 for the third channel has been run by duty control, i.e. if the period of time $t_{DZ}$ for which the braking pressure is increased has reached a predetermined period of time To (for example, 25 ms), i.e. if the period of time $t_{DZ}$ is larger than the period of time To, followed by proceeding to step V15 at which it is decided to determine if deceleration $DW_R$ ($DW_R<0$) for the rear wheel is larger than a predetermined value GO (for example, $-4G$) when it is decided at step V14 that the period of time $t_o$, is longer than the predetermined period of time To. When the result of decision at step V15 indicates that the deceleration $DW_R$ is equal to or shorter than the predetermined value GO, i.e., for example, that the deceleration $DW_R$ is $-2G$, then the program flow goes to step V16 at which the cascade flag $F_{CAS3}$ is set to "1".

When the result of decision at step V15 indicates that the deceleration DW1 is equal to or smaller than the predetermined value To, it is then decided at step V17 to determine if the rear wheels 3 and 4 are being decelerated. Then, at step V18, a further decision is made to determine if the slip ratio S3 is larger than the predetermined value SO when it is decided at step V17 that the rear wheels 3 and 4 are being decelerated, followed by step V19 at which the cascade flag $F_{CAS3}$ is cleared to "0" when it is decided at step V18 that the slip ratio S3 is larger than the predetermined value SO. If it is decided at step V17 that the rear wheels 3 and 4 are not being decelerated and at step V18 that the slip ratio S3 is equal to or smaller than the value So, then the program flow is returned.

On the other hand, when it is decided at steps V2 and V4 that neither the current value of the phase valve P3 is set not to "1" nor the previous value thereof is not to "5" indicative of the state in which the braking pressure is held at the level to which it has been reduced, the cascade flag $F_{CAS3}$ is cleared to "0" at step V20, followed by the return of the program flow.

Figure 7:
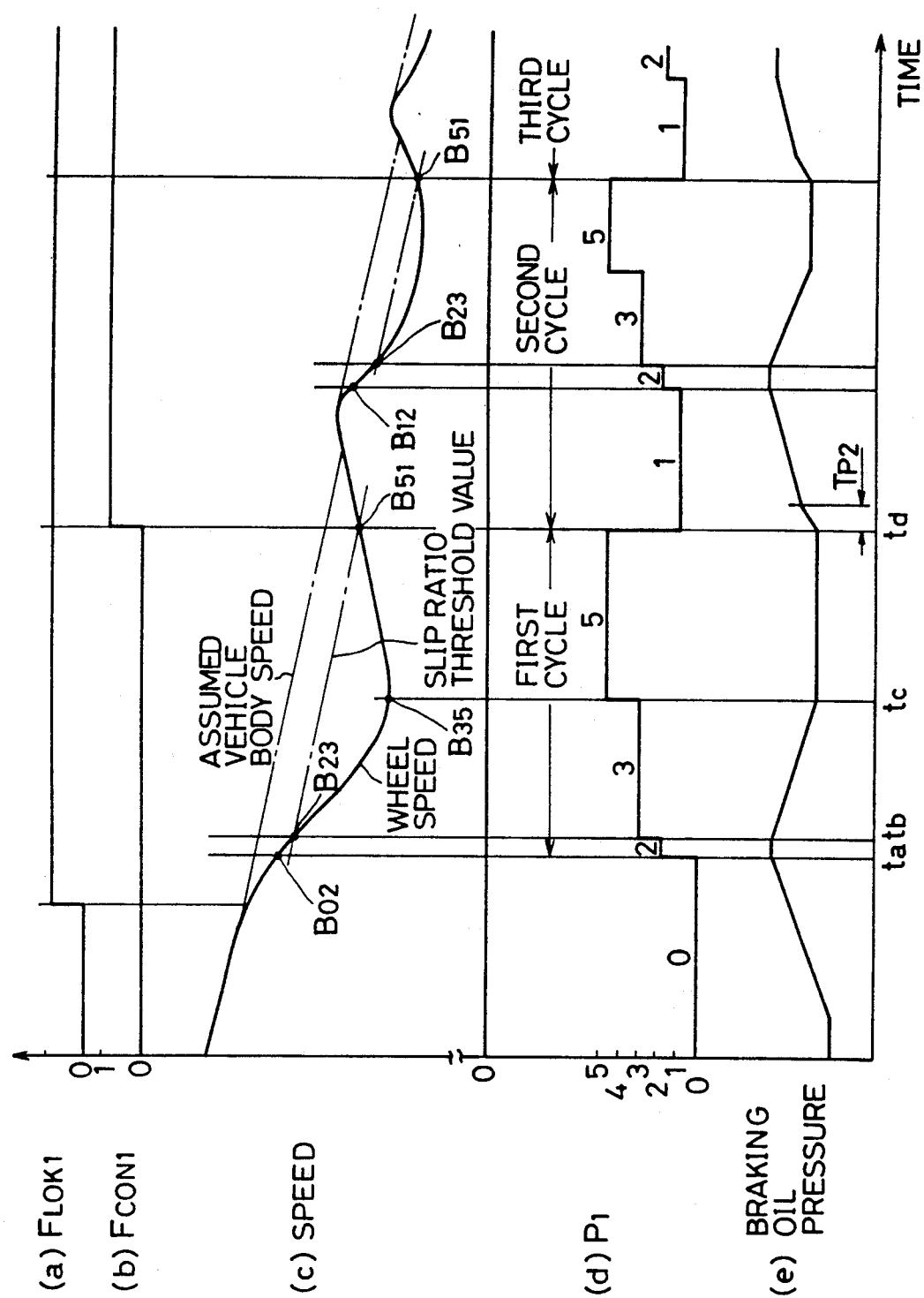
FIGS. 7 to 9 are time charts showing the action of the embodiments of the present invention.

Time Chart (FIG. 7)

The action of the anti-skid system according to the embodiment of the present invention will be described by taking the ABS control for the first channel as an example with reference to FIG. 7 which is directed to the contents of the basic control without the processing for inhibiting the increase in the braking pressure.

In the state in which no ABS control is implemented during reducing the braking pressure, the braking pressure produced by the master cylinder 18 is increased gradually upon operation of depressing the braking pedal 16 and the locking flag $F_{LOK1}$ is set to "1", followed by starting the ABS control from the time $t_a$. In the first cycle immediately after the start of the control, the friction coefficient value MU1 is set to "3" indicating the high friction coefficient $\mu$ so that the control unit 24 sets the various control threshold values corresponding to the high friction coefficient $\mu$.

Then, the control unit 24 compares the slip ratio S1 calculated from the wheel speed W1, the wheel deceleration DW1 and the acceleration AW1 with the corresponding control threshold values. When it is determined that the magnitude of the deceleration DW1 is lowered below $-1.5G$, the control unit 24 changes the phase value P1 from phase value 0 to phase value 2, as indicated by (d) in FIG. 7. Hence, the braking oil pressure is maintained at an elevated level immediately after the increase in the braking pressure, as indicated by (e) in FIG. 7. Then, for example, when the slip ratio S1 is lowered below 90%, the control unit 24 changes the phase value P1 from phase value 2 to phase value 3, thereby turning the relief value 20b of the first valve unit on or off in accordance at a predetermined duty ratio and gradually decreasing the braking oil pressure by reducing the braking pressure at a predetermined gradient from the time $t_b$, as indicated by (e) in FIG. 7. This starts recovering the force for rotating the left-hand front wheel 1.

The control unit 24 then changes the phase value P1 from phase value 3 to 5 when the decrease in the braking oil pressure is continued and the magnitude of the deceleration DW1 given from the wheel speed W1 of the left-hand front wheel 1 has reached the predetermined control threshold value $B_{35}$ indicating the "3-5 deceleration" for determining the shift from the phase III to phase V indicative of the state in which the braking pressure is held at a reduced level after having been decreased. Hence, the braking oil pressure is maintained at a reduced level from the time $t_c$ after it has been decreased, as indicated by (e) in FIG. 7.

When the state of the phase V has been continued and the slip ratio S1 exceeds the predetermined control threshold value $B_{51}$ indicating the "5-1 deceleration" for determining the shift from the phase V to the phase I, then the continuing flag $F_{CON1}$ is set to "1" as indicated by (b) in FIG. 7, thereby shifting the ABS control in the first channel to the second cycle from the time $t°$. In this case, the control unit 24 changes the phase value P1 forcibly to "1".

Immediately after the phase has been shifted to the phase I, the opening-closing valve 20b of the first valve unit 20 is opened or closed at the duty ratio of 100% in accordance with the initial period of time $t_{PZ}$ during which the braking oil pressure is rapidly being increased, which is set on the basis of the period of time for which the phase V has been continued in the first cycle, thereby increasing the braking oil pressure at such a steep gradient as indicated by (e) in FIG. 7. After the initial period of time $t_{PZ}$ for which the braking oil pressure has been rapidly increased has been finished, the opening-closing valve 20a is turned on or off in accordance with a predetermined duty ratio, thereby allowing the braking oil pressure to be gradually increased at a gradient slower than at the steep gradient for the initial period of time $t_{PZ}$.

In the second cycle and thereafter, as shown in FIG. 2, the appropriate friction coefficient value MU1 is determined in accordance with the magnitude of the deceleration DW1, the acceleration AW1 and so on in the previous cycle and, at the same time, the control threshold values corresponding to the friction coefficient value MU1 are selected, thereby permitting elaborate control over the braking oil pressure in accordance with the state of driving the automotive vehicle.

For instance, when the slip ratio S1 is determined to be larger than the control threshold value $B_{51}$ indicating the "5-1 deceleration" in the state of phase V in the second cycle, the control unit 24 sets the phase value P1 to "1" and shifts the first channel to the third channel.

The control as described hereinabove is carried out for each of the second and third channels in substantially the same manner as for the first channel.

Figure 8:
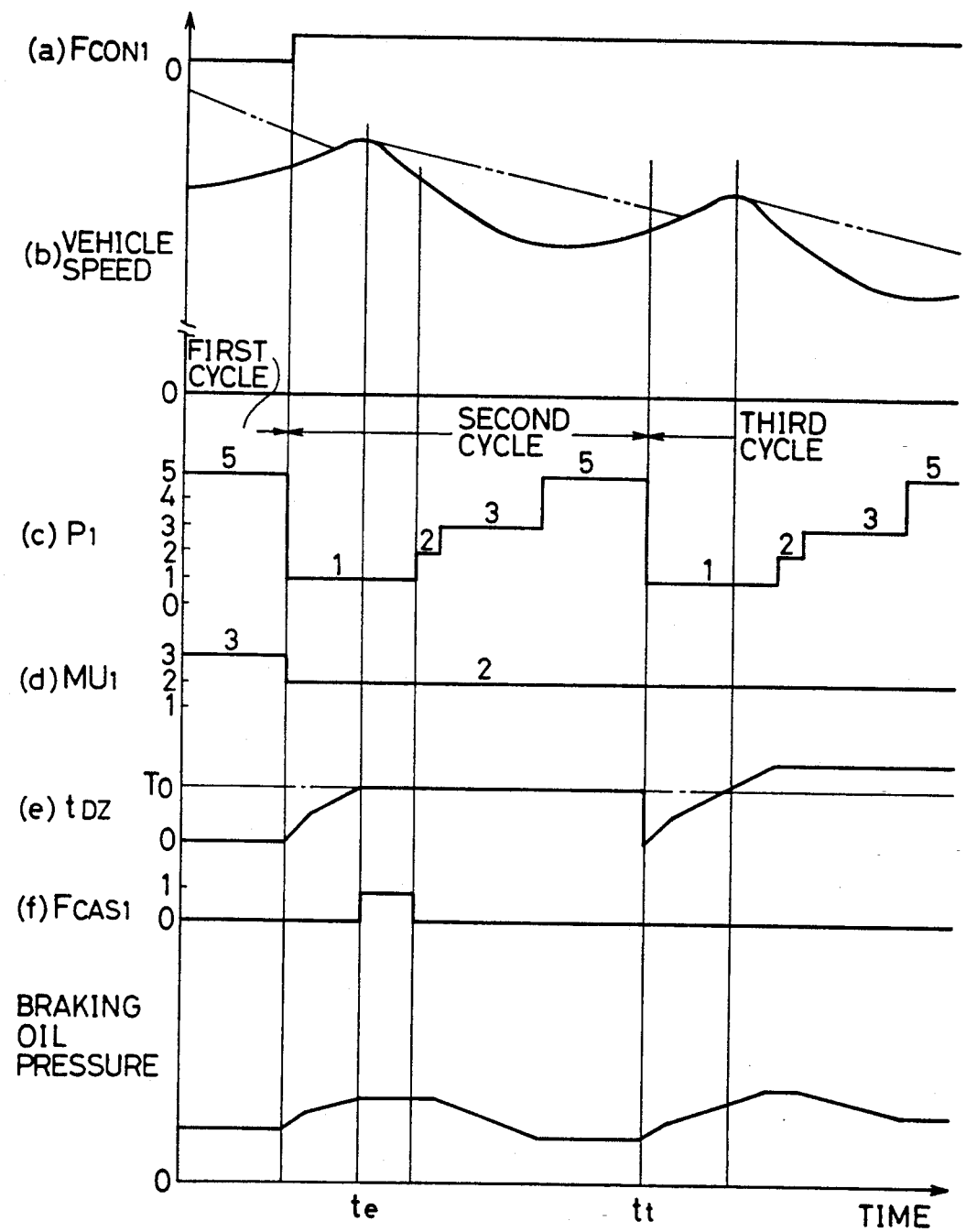

Time Chart (FIG. 8)

Description will now be made of the processing for inhibiting the increase in the braking oil pressure with reference to FIG. 8 which corresponds to the contents at step U16 of FIG. 5.

Although the phase value P1 is set to "1" and the braking oil pressure is increased when the first cycle immediately after the start of the control has been shifted to the second cycle, the control unit 24 monitors the signals indicative of the control over the braking oil pressure to the first valve unit 20 and sets the cascade flag $F_{CAS1}$ to "1" when the magnitude of the deceleration DW1 is determined to be larger (when the result of decision at step U15 in FIG. 5 is found in the affirmative) at the moment when the run period of time $t_{DZ}$ for increasing the braking oil pressure, which is given from a duty-ON signal for the opening-closing valve 20a, has reached the predetermined period of time To. Hence, the increase in the braking oil pressure from the time $t_e$ is ceased, thereby failing to act an excessive braking force upon the left-hand front wheel 1.

On the other hand, when the magnitude of the deceleration DW1 is determined to be smaller (when the negative result of decision at step U15 in FIG. 5 is given) at the time $t_e$ when the run period of time $t_{DZ}$ for increasing the braking oil pressure has reached the predetermined value To in the third cycle, the cascade flag $F_{CAS1}$ is not set to "1", thereby allowing the braking oil pressure to be continuously increased while the phase value P1 is kept set to "1".

It is to be noted herein that the increase in the braking oil pressure is inhibited when the conditions as described hereinabove are met during shift from phase IV to phase I. Further, it is to be noted that the foregoing description can be applied to steps V14 to V16 for the rear wheels in FIG. 6 in substantially the same manner.

Further, when the magnitude of deceleration of the wheel is so small when the total sum of the quantities of the braking oil pressure increased in the phases in which the braking oil pressure is to be increased has reached a predetermined value, the control for increasing the braking oil pressure by control means is inhibited in the phase for increasing the braking oil pressure after the phase for decreasing it or in the phase following the phase for holding the braking oil pressure at a reduced level after having been decreased, thereby suppressing the number of rotations of the wheel from being reduced. This can prevent the wheel speed from being lowered to an excessive extent even if the wheel is locked in a state in which the rate of depressing the braking pedal is less on such a low friction coefficient such as an ice-covered road surface, and occurrence of the so-called cascade locking can be prevented with high certainty because the wheel speed can exceed the assumed vehicle body speed when the braking oil pressure is to be decreased at the next occasion.

Time Chart (FIG. 9)

FIG. 9 shows the manner in which the increase in the braking oil pressure for the rear wheels is inhibited in connection with the flowchart as shown in FIG. 6.

For instance, when the third channel is shifted to the second cycle, the control unit 24 sets the cascade flag $F_{CAS3}$ for the third channel to "1" (refer to steps V5 to V7 in FIG. 6). This suppresses the braking pressure from being increased, as indicated by (e) in FIG. 9, in spite of the phase V indicating the state in which the braking oil pressure is increased and the rear wheel speed $W_R$ exceeds the assumed vehicle body speed $V_R$ as indicated by (b) therein, thereby renewing the assumed vehicle body speed $V_R$ so as to agree with the rear wheel speed $W_R$ and thereafter to be decreased at a predetermined gradient in accordance with the friction coefficient value MU. Then, the control unit 24 clears the value of the cascade flag $F_{CAS3}$ to "0", as referred to at steps V9 to V11 and at steps V17 and V19, when the slip ratio S3 for the third channel is equal to or larger than the predetermined value SO in such a given state that the rear wheel speed $W_R$ has started decreasing. Hence, the braking pressure continues elevating during the phase I as indicated by (e) in FIG. 9, thereby preventing the braking pressure from being decreased to an excessive extent during the period of time for increasing the braking pressure and as a consequence avoiding a decrease in braking performance.

Further, when the third channel has been shifted from the second cycle to the third cycle, the control unit 24 sets the value of the cascade flag $F_{CAS3}$ for the third channel to "1", as referred to at steps V8 to V10, when the friction coefficient value MU3 in the third channel is set to "1" indicative of the low friction coefficient $\mu$. Hence, in this case, too, the increase in the braking oil pressure is suspended, thereby causing the rear wheel speed $W_R$ to exceed the assumed vehicle body speed $V_R$ and as a result renewing the assumed vehicle body speed $V_R$ so as to agree with the rear wheel speed $W_R$. Then, the assumed vehicle body speed $V_R$ is reduced at a predetermined gradient in accordance with the friction coefficient value MU in such a manner that it does not become too far apart from the actual vehicle body speed.

When the phase IV is shifted to the phase I, too, the increase of the braking oil pressure is suppressed when the aforesaid conditions are met.

As described hereinabove, when the control systems for the rear wheels or the front wheels have been shifted from the first cycle immediately after the start of the control to the second cycle, the inhibition is implemented for the control for increasing the braking oil pressure in the phase for increasing it which follows the phase for reducing the braking oil pressure or which follows the phase for holding it at a reduced level after it has been reduced, thereby allowing the number of rotation of the rear wheels to be kept increasing and the wheel speed to outnumber the assumed vehicle body speed with certainty. This renews the assumed vehicle body speed even on a road surface having such a low friction coefficient $\mu$ such as on an iced-covered road surface, thereby making the so-called cascade locking unlikely to occur.

It is further to be noted that, when the front wheel is not accelerated, i.e., for example, when the wheel speed which has once been elevated by reducing the braking pressure is caused to be reduced due to resistance to a road, the operation of the inhibition means for inhibiting the increase in the braking oil pressure is released, thereby avoiding a decrease in the braking pressure to be caused because of lack of the increase in the braking pressure.

In addition, it is to be noted that the so-called cascade locking can certainly be prevented from occurring against the rear wheels whose wheel speeds vary at a rate slower than the wheel speeds of the front wheels, because the inhibition means is so arranged as to be released with a ratio of the assumed vehicle body speed to the wheel speed of the rear wheels, i.e. a slipping state of the rear wheels, taken into account.

Figure 10:
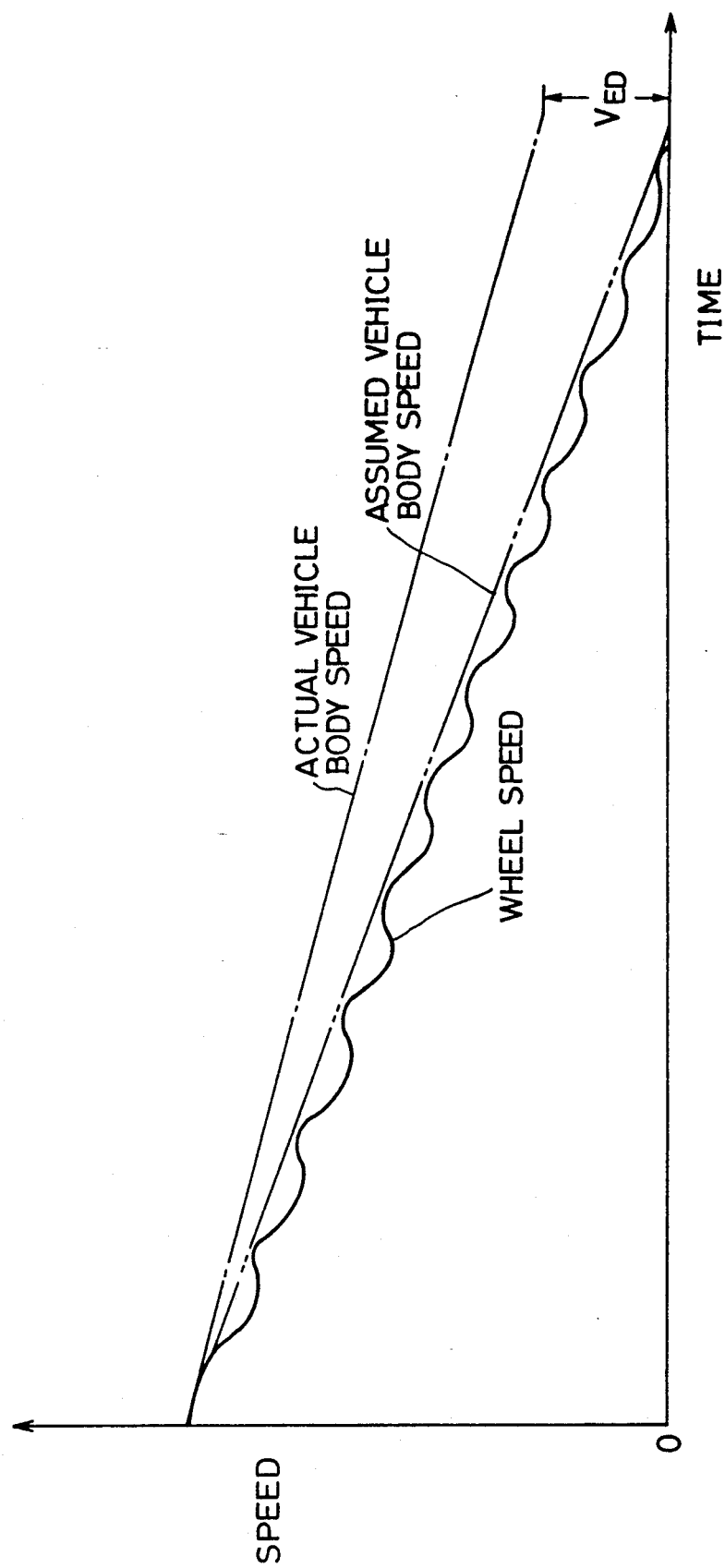
FIG. 10 is a schematic representation showing the mode in which the assumed vehicle body speed is largely reduced from the actual vehicle body speed.

Furthermore, if the wheel speed is not returned to the assumed vehicle body speed, a decrement $V_{ED}$ of the actual vehicle body speed relative to the assumed vehicle body speed becomes larger as time elapses, as shown in FIG. 10, thereby causing the so-called cascade locking to occur.

It is to be understood that the present invention is not intended in any means to be limited to those described hereinabove and the present invention should be interpreted as encompassing within the scope and spirit thereof any and all variations and modifications not deviating from the spirit of the invention.

What is claimed is:

1. An anti-skid brake system for an automotive vehicle having wheels, comprising:

wheel speed detecting means for detecting a speed of rotation of each wheel independently;

braking oil pressure adjusting means for adjusting braking oil pressure for a hydraulic brake unit for applying a braking force to each wheel;

assumed vehicle body speed determining means for determining an assumed vehicle body speed on the basis of a wheel speed of each wheel detected by the wheel speed detecting means;

braking oil pressure controlling means for controlling the braking oil pressure adjusting means so as to periodically increase and decrease the braking oil pressure at the moment of braking, on the basis of a comparison between the wheel speed detected by the wheel speed detecting means and the assumed vehicle body speed determined by the assumed vehicle body speed means;

locking-state detecting means for detecting a state of incipiently locking one of the wheels at the moment of braking before the wheel speed is returned to the assumed vehicle body speed determined by the assumed vehicle body speed determining means; and inhibition means for inhibiting the braking oil pressure from increasing when the state of incipiently locking the wheel is detected by the locking-state detecting means.

2. An anti-skid brake system as claimed in claim 1, wherein:

a cycle in which the braking oil pressure is increased or decreased periodically contains a first phase for increasing the braking oil pressure, a second phase for reducing the braking oil pressure, and a third phase for holding the braking oil pressure at a reduced level after the braking oil pressure has been reduced; and the inhibition means for inhibiting the braking oil pressure inhibits at least the increase in the braking oil pressure in the first phase when the cycle is shifted to the first phase and also when the second phase is shifted to the first phase.

3. An anti-skid brake system as claimed in claim 2, wherein the cycle in which the braking oil pressure is increased and decreased periodically further contains a fourth phase for holding the braking oil pressure at an increased level after the braking oil pressure has been increased.

4. An anti-skid brake system as claimed in claim 3, wherein the cycle is set in a continuous order of the first phase, the fourth phase, the second phase and the third phase.

5. An anti-skid brake system as claimed in claim 4, wherein the cycle immediately subsequent to starting controlling is a first cycle, and starts with the fourth phase and continues while skipping the first phase.

6. An anti-skid brake system as claimed in claim 2, wherein phases are changed on the basis of a magnitude of acceleration or deceleration of one of the wheels and a ratio of the speed of rotation of the wheel to the assumed vehicle body speed determined by the assumed vehicle body speed determining means, the ratio being a slip value.

7. An anti-skid brake system as claimed in claim 6, wherein:

a first threshold value for the magnitude of at least one of acceleration and deceleration of the wheel and a second threshold value for the slip value are set in order to change the order of the phases; and each of the first threshold value and the second threshold value is changed on the basis of a friction coefficient $\mu$.

8. An anti-skid brake system as claimed in claim 1, wherein the braking oil pressure is held at a level of the braking oil pressure immediately prior to inhibition of the increase in the braking oil pressure when the increase in the braking oil pressure is inhibited by the inhibition means.

9. An anti-skid brake system as claimed in claim 1, wherein:
the locking-state detecting means comprises:
adding means for adding up signals, indicative of the increase in the braking oil pressure, generated by the braking oil pressure adjusting means in the first phase to give a sum of the signals, indicative of the increase in the braking oil pressure;
deceleration detecting means for detecting a magnitude of deceleration of one of the wheels; and
determination means for determining if the magnitude of deceleration of the wheel detected by the deceleration detecting means is equal to or lower than a predetermined value at the moment when the sum produced by the adding means has reached a predetermined value;
wherein the state of incipiently locking the wheel is detected when the determination means determines that the magnitude of deceleration of the wheel is equal to or lower than the predetermined value.

10. An anti-skid brake system as claimed in claim 9, wherein the deceleration detecting means is to calculate the magnitude of deceleration of the wheel on the basis of the wheel speed detected by the wheel speed detecting means.

11. An anti-skid brake system as claimed in claim 1, wherein the locking-state detecting means is to detect the state of incipiently locking the wheel when a first braking cycle is shifted immediately after the start of controlling to a second braking cycle which follows, in which the braking oil pressure is increased and decreased periodically.

12. An anti-skid brake system as claimed in claim 11, wherein:
the locking-state detecting means is to detect the state of incipiently locking a rear wheel when the first braking cycle is shifted immediately after the start of controlling to the second cycle which follows, in which the braking oil pressure for the rear wheel is increased and decreased periodically; and
the inhibition means inhibits the increase in the braking oil pressure for the rear wheel.

13. An anti-skid brake system as claimed in claim 12, further comprising releasing means for releasing the inhibition of the increase in the braking oil pressure for the rear wheel by the inhibition means when no rear wheel is accelerated and when the wheel speed of the rear wheel relative to the assumed vehicle body speed detected by the assumed vehicle body speed detecting means is equal to or higher than a predetermined value.

14. An anti-skid brake system as claimed in claim 11, wherein:
the locking-state detecting means is to detect the state of incipiently locking a front wheel when either one of a left-hand front wheel or a right-hand front wheel shifts from the first braking cycle to the second braking cycle immediately after the start of control, in one cycle in which the braking oil pressure for either of a left-hand front wheel or a right-hand front wheel is increased and decreased periodically; and
the inhibition means inhibits the increase in the braking oil pressure for the left-hand front wheel or the right-hand front wheel, whichever has shifted earlier from the first cycle to the second cycle.

15. An anti-skid brake system as claimed in claim 14, further comprising releasing means for releasing the inhibition of the increase in the braking oil pressure for the front wheel by the inhibition means when the front wheel for which the increase in the braking oil pressure is inhibited by the inhibition means is not accelerated.

16. An anti-skid brake system as claimed in claim 1, wherein the locking-state detecting means is to detect the state of incipiently locking one of the wheels when a friction coefficient $\mu$ on road surface is smaller than a predetermined value.

17. An anti-skid brake system as claimed in claim 16, further comprising releasing means for releasing the inhibition of the increase in the braking oil pressure for a rear wheel by the inhibition means when the rear wheel for which the increase in the braking oil pressure is inhibited by the inhibition means is not accelerated and when the wheel speed of the rear wheel relative to the assumed vehicle body speed is equal to or higher than a predetermined value.

18. An anti-skid brake system as claimed in claim 16, further comprising releasing means for releasing the inhibition of the increase in the braking oil pressure for a front wheel by the inhibition means when the front wheel for which the increase in the braking oil pressure is inhibited by the inhibition means is not accelerated.

19. An anti-skid brake system as claimed in claim 16, wherein the locking-state detecting means is to detect the state of incipiently locking the wheel when a value of a lowest friction coefficient $\mu$ is the lowest selected out of a plurality of preset friction coefficients $\mu$.

20. An anti-skid brake system as claimed in claim 1, further comprising releasing means for releasing the increase in the braking oil pressure when a predetermined condition is met.

21. An anti-skid brake system as claimed in claim 20, wherein the predetermined condition contains a condition that one of the wheels is not accelerated.

22. An anti-skid brake system as claimed in claim 20, wherein the predetermined condition contains a condition that one of the wheels is not accelerated and a condition that a ratio of the speed of rotation of the wheel to the assumed vehicle body speed becomes equal to or higher than a predetermined value.

23. An anti-skid brake system as claimed in claim 1, wherein the assumed vehicle body speed determining means determines the assumed vehicle body speed on a basis of the highest wheel speed out of all the wheel speeds detected by the wheel speed detecting means.

24. An anti-skid brake system as claimed in claim 23, wherein the assumed vehicle body speed determining means determines as a current assumed vehicle body speed a value obtained by subtracting a predetermined value from a previous assumed vehicle body speed when a rate at which the wheel speed of the wheel indicating the highest wheel speed changes within a predetermined period of time is smaller than a predetermined value.

25. An anti-skid brake system as claimed in claim 23, wherein the assumed vehicle body speed determining means determines as a current assumed vehicle body speed a value obtained by subtracting a predetermined value from a previous assumed vehicle body speed when a deviation between the highest wheel speed and a previous assumed vehicle body speed is smaller than a predetermined value.

26. An anti-skid brake system as claimed in claim 23, wherein the assumed vehicle body speed determining means determines the highest wheel speed as a current assumed vehicle body speed when a deviation between the highest wheel speed and a previous assumed vehicle body speed is larger than a predetermined value.

27. An anti-skid brake system as claimed in claim 1, wherein the assumed vehicle body speed determining means comprises:
 first determination means for determining as a current assumed vehicle body speed a value obtained by subtracting a predetermined value from a previous assumed vehicle body speed when a rate at which a wheel speed of the wheel indicating a highest wheel speed changes within a predetermined period of time is smaller than a first predetermined value;
 second determination means for determining as a current assumed vehicle body speed a value obtained by subtracting the first predetermined value from the previous assumed vehicle body speed when no assumed vehicle body speed is determined by the assumed vehicle body speed determining means and when a deviation between the highest wheel speed and a previous assumed vehicle body speed is smaller than a second predetermined value; and
 third determination means for determining the highest wheel speed as a current assumed vehicle body speed when the assumed vehicle body speed is determined neither by the first determination means or by the second determination means.

28. An anti-skid brake system as claimed in claim 27, wherein the first predetermined value is set to become smaller as a friction coefficient $\mu$ becomes smaller.

* * * * *